Aug. 22, 1961  H. W. GAMBLE  2,996,955
SUNGLASS FRAME
Filed Jan. 31, 1957
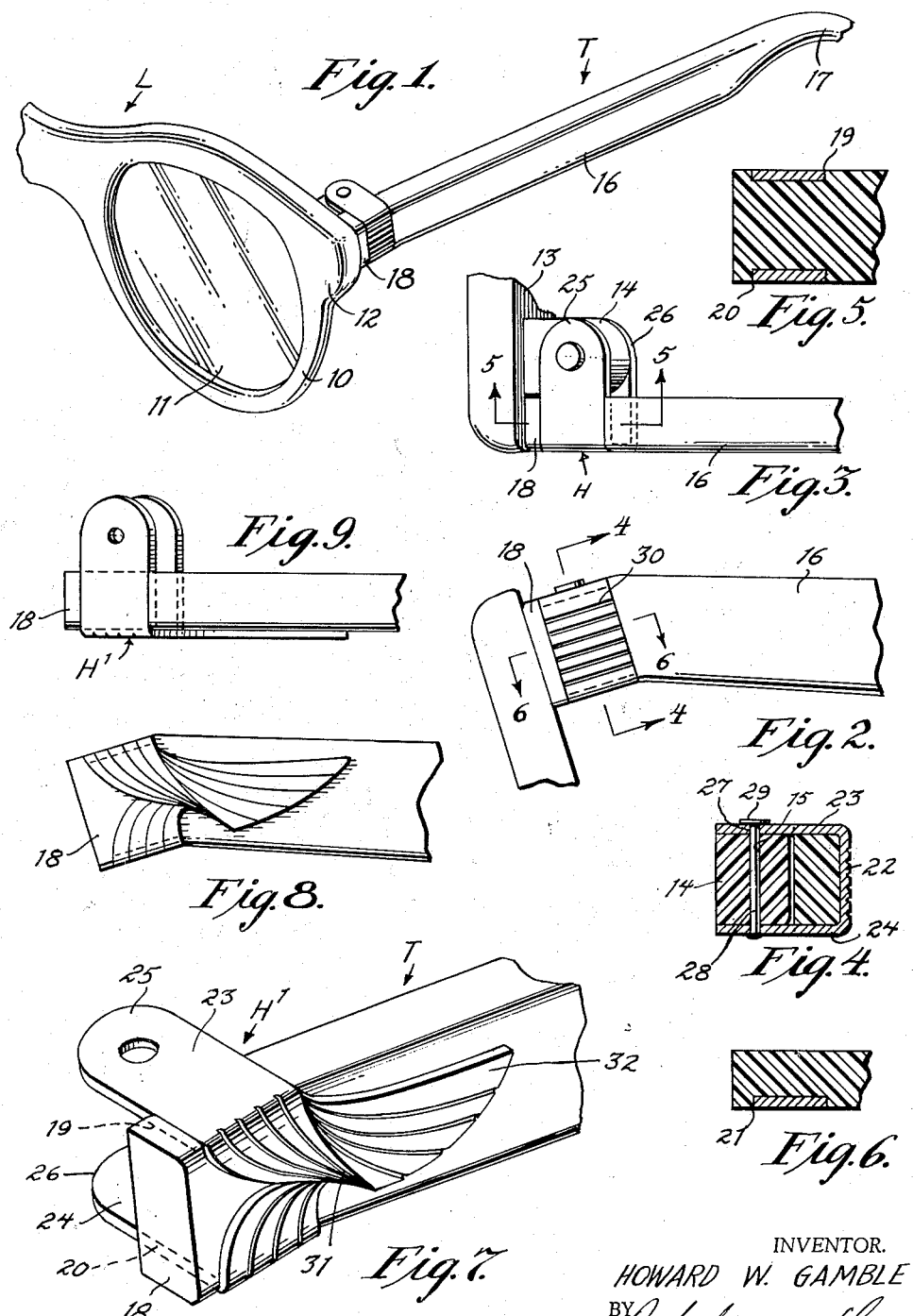
INVENTOR.
HOWARD W. GAMBLE
BY Robertson and Goutie
ATTORNEYS.

United States Patent Office

2,996,955
Patented Aug. 22, 1961

2,996,955
SUNGLASS FRAME
Howard W. Gamble, Morton, Pa., assignor to Bachmann Bros., Inc., Philadelphia, Pa., a corporation of Pennsylvania
Filed Jan. 31, 1957, Ser. No. 637,511
1 Claim. (Cl. 88—53)

The present invention relates to eyeglass frames broadly and is concerned primarily with certain improvements in the particular type of eyeglass frame which is now widely used in the manufacture of sunglasses and which is properly identified as a sunglass frame.

A sunglass frame of the type with which this invention is concerned ordinarily comprises a lens holder on which are pivotally mounted a pair of temples. It is now the universal practice to make both the lens holder and the temples of a plastic such as any of the well-known acetates that are commonly employed for this purpose. The pivotal connection between each temple and the lens holder requires a hinge.

In the cheaper sunglass frames the elements of the hinge, with the exception of the hinge pintle, have been of plastic and integrally formed on the lens holder and temple, respectively. In the higher-grade products which command a greater sales value, metallic hinges have been employed. However, such metallic hinges are an important factor in the cost of such sunglass frames.

With the foregoing conditions in mind, the present invention has in view as its foremost objective the provision, in a sunglass frame, of a composite hinge which will give the appearance of a metallic hinge and yet may be manufactured more cheaply than the metallic hinges heretofore employed. This composite hinge consists essentially of a hinge lug which is formed as an integral part of the lens holder, together with a metallic hasp which encompasses the end of the temple and presents a pair of ears which receive the lug therebetween. A hinge pintle passes through aligned openings in these ears and lug, respectively.

The metallic hasp aforesaid is susceptible of easy and cheap manufacture and may be readily assembled on the temple in such a manner as to preclude any movement relative thereto.

In achieving this latter feature, a further object is to provide, in a sunglass frame of the type aforesaid, a temple having one end formed with recesses for receiving the metallic hasp. These recesses may be formed on the opposed side edges of the temple and may be supplemented by a third recess connecting the recesses on the side edges and which extends across the outer face of the temple.

Various other more detailed objects and advantages of the invention, such as arise in connection with carrying out the above-noted ideas in a practical embodiment, will in part become apparent and in part be hereinafter stated as the description of the invention proceeds.

The invention therefore comprises a sunglass frame including a lens holder having a hinge lug integrally formed therewith and a temple having one end recessed to accommodate a metallic hasp which presents a pair of ears receiving the lug, with a hinge pintle passing through aligned openings in said lug and ears.

For a full and more complete understanding of the invention, reference may be had to the following description and accompanying drawing, wherein:

FIGURE 1 is a perspective view of a portion of a sunglass frame designed in accordance with the precepts of this invention;

FIGURE 2 is a fragmentary view in side elevation taken on an enlarged scale of that portion of the frame including the hinge connection between the temple and frame;

FIGURE 3 is a top plan view of the structure shown in FIGURE 2;

FIGURE 4 is a vertical section taken about on the plane represented by the line 4—4 of FIGURE 2;

FIGURE 5 is another section taken substantially normal to the showing of FIGURE 4 and about on the plane represented by the line 5—5 of FIGURE 3;

FIGURE 6 is a horizontal section taken about on the plane represented by the line 6—6 of FIGURE 2;

FIGURE 7 is a detailed perspective illustrating a modification employed in sunglass design primarily for women;

FIGURE 8 is a view in side elevation of the temple and hasp depicted in FIGURE 7; and FIGURE 9 is a top plan view of the temple and hasp shown in FIGURES 7 and 8.

Referring now to the drawing, wherein like reference characters denote corresponding parts, and first more particularly to FIGURES 1–6, inclusive, a portion of a sunglass frame is therein illustrated as comprising a lens holder, which is referred to in its entirety by the reference character L, and a temple T. The lens holder L is made from any of the plastics now commonly used in the manufacture of sunglasses. Acetate is the plastic most commonly employed. This is also true of the temple T.

The lens holder L includes an oval-shaped portion at 10 which receives a lens 11. At the upper outer corner there is an ear 12, the rear face of which is identified at 13 in FIGURE 3. Extending outwardly from this rear face 13 is a lug 14 which is integral with the lens holder L. After the lens holder L and lug 14 have been molded, the lug 14 is drilled to provide a passage 15 (FIGURE 4) for accommodating a hinge pintle, as will be later described.

The temple T comprises an intermediate main body portion 16, which terminates at one end in a curved structure 17 that engages the wearer's head about the ear and at the other end in an offset portion 18. The offset portion 18 is located generally in the corner defined by the lug 14 and rear face 13 of the ear 12. It is formed with recesses 19 and 20 (FIGURE 5) on its upper and lower end edges, respectively. These recesses 19 and 20 are connected by recess 21 formed on the outer face of the offset portion 18.

A metallic hasp is referred to in its entirety by the reference character H. It may be made of any appropriate metal and is of U-shaped formation defined by a back 22 and sides 23 and 24. The back 22 is received in the recess 21, the side 23 in the recess 19, and the side 24 in the recess 20. Thus the hasp H is securely held against longitudinal movement relative to the temple T.

The sides 23 and 24 extend inwardly beyond the inner face of the temple to provide a pair of ears 25 and 26. These ears receive the lug 14 therebetween and are formed with openings 27 in alignment with the passageway 15. A hinge pintle 28 passes through these aligned openings and has a head 29 at one end, with the other end being peened or riveted in a well-known manner to prevent disassembly.

It is evident that the metallic hasp H offers the appearance of a metallic hinge; and the back 22 is susceptible of having a desired ornamentation impressed thereon, such as the grooves shown at 30. Moreover, a secure and effective hinge is provided.

*The modification*

A slightly modified form of the invention is illustrated in FIGURES 7, 8, and 9; and which form is particularly adapted to sunglasses designed for women, in which it is desirable that the hinge be more decorative. In this form of the invention the offset end portion of the temple T is formed only with the grooves 19 and 20 on the upper and lower edges. Thus the outer face is left free of any groove corresponding to the groove 21.

The hasp shown at H' includes the usual sides 23 and 24 presenting the ears 25 and 26; but the back 22 is replaced by a back 31 having an extension 32. This extension 32 not only presents a functional advantage in providing a more secure achorage of the hasp when the recess 21 is omitted, but also makes possible the use of the ornamental effect clearly illustrated in FIGURES 7 and 8.

While preferred specific embodiments of the invention are hereinbefore set forth, it is to be clearly understood that the invention is not to be limited to the exact designs, constructions, and arrangements illustrated and described, because various modifications of these details may be provided in putting the invention into practice within the purview of the appended claim.

What is claimed is:

In a sunglass frame, a plastic lens holder having a rear face, a plastic lug integrally molded on said lens holder extending outwardly from said rear face and formed with a generally vertically extending through passageway, a plastic temple having an angularly offset end portion located adjacent to said lug and formed with recesses on its upper and lower edges with the recesses being located closely adjacent to the free end of said offset end portion, a metal hasp having sides conformably received in said recesses and presenting a pair of ears closely receiving said lug therebetween and formed with openings in alignment with said passageway, said hasp also including a back formed with an extension overlying and in reinforcing facing engagement with said temple in the area extending from said hasp beyond said offset end portion, and a hinge pintle in said aligned openings and passageway.

References Cited in the file of this patent

UNITED STATES PATENTS

| | | |
|---|---|---|
| 2,490,868 | Hansen | Dec. 13, 1949 |
| 2,684,014 | Fairly | July 20, 1954 |